United States Patent [19]

Lütze et al.

[11] 4,293,160
[45] Oct. 6, 1981

[54] SIDE GUARD FOR MOTOR VEHICLE

[75] Inventors: Hans Lütze, Aidlingen; Helmut Weisshappel, Sindelfingen; Wolfgang Klie, Korntal; Dieter Weidemann, Weil der Stadt, all of Fed. Rep. of Germany

[73] Assignee: Daimler-Benz Aktiengesellschaft, Stuttgart, Fed. Rep. of Germany

[21] Appl. No.: 60,479

[22] Filed: Jul. 25, 1979

[30] Foreign Application Priority Data

Aug. 18, 1978 [DE] Fed. Rep. of Germany ....... 2836213

[51] Int. Cl.³ .............................................. B62D 25/02
[52] U.S. Cl. ..................................... 296/188; 296/146
[58] Field of Search ....................... 296/146, 187, 188; 280/748

[56] References Cited

U.S. PATENT DOCUMENTS

| 3,887,227 | 6/1975 | Deckert | 296/188 |
| 3,944,278 | 3/1976 | Takahashi et al. | 296/146 |
| 4,013,317 | 3/1977 | Reidelbach et al. | 296/188 |

FOREIGN PATENT DOCUMENTS 717949 11/1954 United Kingdom ............... 296/188

Primary Examiner—Joseph F. Peters, Jr.
Assistant Examiner—Ross Weaver
Attorney, Agent, or Firm—Craig and Antonelli

[57] ABSTRACT

A side guard or lateral protection arrangement for motor vehicles, wherein at least one reinforcement, extending substantially in the longitudinal direction of the vehicle, is arranged within each of the side doors. The reinforcements are braced in case of a force effective in the longitudinal direction of the vehicle, with each end directly or indirectly against a component fixedly mounted to the vehicle or against a further reinforcement associated with an adjacent door. This bracing takes place in the longitudinal direction of the vehicle. The reinforcements are axially adjustable in their lengths so as to bridge a space between an end of the reinforcement means and the component fixedly mounted to the vehicle or further reinforcement, which space results from manufacturing tolerances in the construction of the motor vehicle.

8 Claims, 2 Drawing Figures

U.S. Patent    Oct. 6, 1981    4,293,160
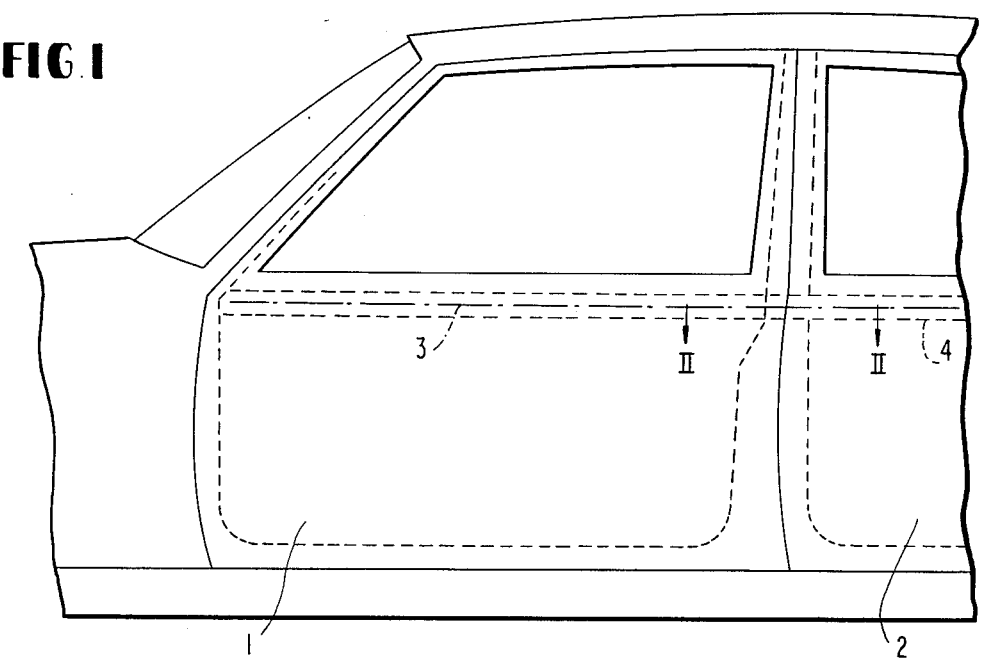
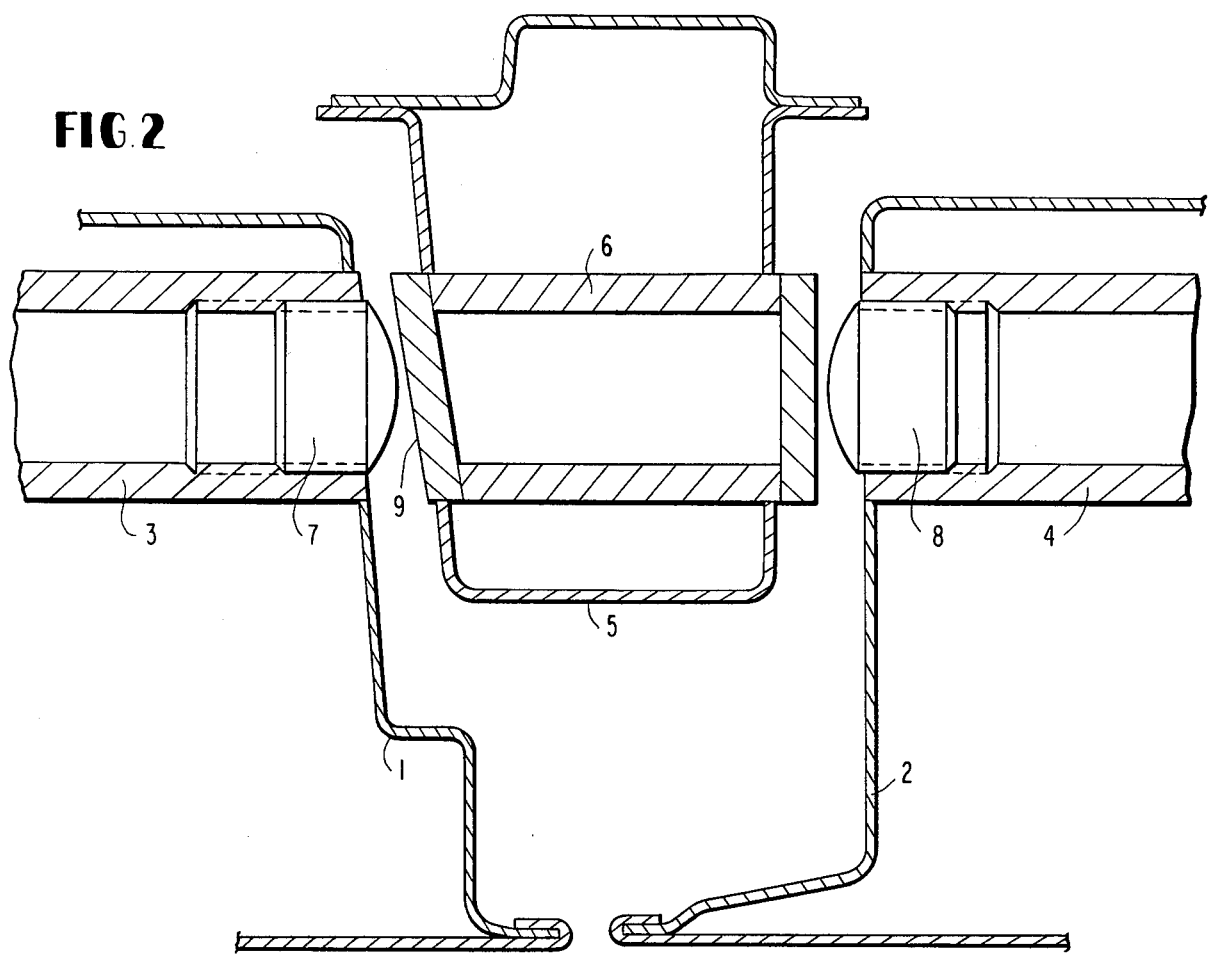

SIDE GUARD FOR MOTOR VEHICLE

The present invention relates to a side guard or lateral protection arrangement for motor vehicles wherein at least one reinforcing means, extending substantially in the longitudinal direction of the vehicle, is arranged within the side doors.

In German Offenlegungsschrift No. 1,962,279, it is proposed to provide hollow bearers consisting of sheet metal on the inside of a door of a motor vehicle, which hollow bearers serve for the purpose of reinforcing the door and thereby protecting vehicle passengers against laterally incurring impacts in case of accidents.

In U.S. Pat. No. 4,013,317, a side guard or lateral protection arrangement for motor vehicles is proposed wherein the at least one reinforcement arranged in the side doors and extending in the longitudinal direction of the vehicle are braced in case of a force effective in the longitudinal direction of the vehicle with each end directly or indirectly against a component fixedly mounted to the vehicle or against a further reinforcement associated with an adjacent door.

The side guard arrangement such as proposed in the aforementioned United States patent not only serves for a lateral protection but also for an absorption of forces effective in the longitudinal direction of the vehicle which forces would occur in case of a frontal or rear collision of the vehicle. However, one difficulty in absorbing such lateral forces resides in the fact that, due to tolerances which are unavoidable in vehicle construction, relatively large gaps generally remain between the ends of the individual reinforcing elements. Consequently, during an accident or collision, for example, first the vehicle doors are deformed to a substantial extent before a continuous flow of force occurs by way of the reinforcements. However, with such deformation, it can result that the vehicle doors can no longer be readily opened after a crash.

The aim underlying the present invention essentially resides in providing a side guard or lateral protection arrangement for motor vehicles which ensures a direct flow of force practically without previous deformation of the vehicle body parts.

In accordance with advantageous features of the present invention, the at least one reinforcement, extending substantially in the longitudinal direction of the vehicle and arranged within the side doors of the vehicle is constructed so as to be adjustable in length. By virtue of the adjustability of the at least one reinforcement, it is possible to bridge the gaps which would normally remain between the ends of the individual reinforcement and structural parts of the vehicle.

In accordance with a further advantageous feature of the present invention, the reinforcements are formed by tubes which have end members threadably inserted therein. Advantageously, the surface of the free ends of the end members which serve for bracing action is fashioned so as to be spherical. Additionally, the spherical end members may cooperate with bevelled counter surfaces.

Accordingly, it is an object of the present invention to provide a side guard or lateral protection arrangement for motor vehicles which avoids, by simple means, shortcomings and disadvantages encountered in the prior art.

Another object of the present invention resides in providing a side guard or lateral protection arrangement for motor vehicles which ensures a direct flow of force in the reinforcing elements without a previous deformation of vehicle body parts.

Still a further object of the present invention resides in providing a side guard or lateral protection arrangement for motor vehicles which is simple in construction and therefore relatively inexpensive to manufacture.

These and other objects, features, and advantages of the present invention will become more apparent from the following description when taken in connection with the accompanying drawings which show, for the purposes of illustration only, one embodiment in accordance with the present invention, and wherein:

FIG. 1 is a partial side view of a passenger motor vehicle having reinforcements in accordance with the present invention arranged in the respective doors; and FIG. 2 is an enlarged cross-sectional view, taken along line II—II of FIG. 1.

Referring now to the drawing wherein like reference numerals are used in both views to designate like parts and, more particularly, to FIG. 1, according to this figure, tubular reinforcements 3, 4 are arranged in doors 1, 2 of a motor vehicle with the tubular reinforcements 3, 4 extending in the longitudinal direction of the vehicle.

A further reinforcement 6 is arranged in a central pillar 5 so as to bridge the interspace between the ends of the tubular reinforcements 3, 4. End members 7, 8 are adjustably threaded into the reinforcements 3, 4 so as to compensate for the gap between the reinforcements 3,6 or 6,4 which gap occurs due to normal manufacturing tolerances. After assembly of the motor vehicle has been completed, the interspace or gap between the reinforcements can be reduced to a minimum.

The surfaces of the free ends of the end members 7, 8 which serve for supporting purposes, are constructed so as to be spherical. Advantageously, such a spherical surface may cooperate with an inclined surface 9 of the further reinforcement 6.

While we have shown and described only one embodiment in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A lateral protection arrangement for side doors of a motor vehicle, the arrangement including at least one reinforcement means arranged within each of the side doors of the vehicle so as to extend substantially in a longitudinal direction of the vehicle, each of the reinforcement means being adapted to be braced responsive to an application of a compressive force effective in a longitudinal direction of the vehicle, one of directly and indirectly against a fixed vehicle component, characterized in that means are provided for adjusting a length of the reinforcement means so as to bridge a space between an end of the reinforcement means and the fixed vehicle component.

2. A lateral protection arrangement for side doors of a motor vehicle, the arrangement including at least one reinforcement means arranged within each of the side doors of the vehicle so as to extend substantially in a longitudinal direction of the vehicle, each of the reinforcement means being adapted to be braced, in case of an application of a force effective in a longitudinal direction of the vehicle, one of directly and indirectly against a fixed vehicle component, characterized in that means are provided for adjusting a length of the reinforcement means so as to bridge a space between an end of the reinforcement means and the fixed vehicle component, and in that the reinforcement means are constructed as tubular members, and in that said adjusting means includes end members adapted to be threadably inserted into ends of the tubular members.

3. A lateral protection arrangement for side doors of a motor vehicle, the arrangement including at least one reinforcement means arranged within each of the side doors of the vehicle so as to extend substantially in a longitudinal direction of the vehicle, each of the reinforcement means being adapted to be braced, in case of an application of a force effective in a longitudinal direction of the vehicle, one of directly and indirectly against a fixed vehicle component, characterized in that means are provided for adjusting a length of the reinforcement means so as to bridge a space between an end of the reinforcement means and the fixed vehicle component, and in that the end members include a bracing surface, and in that the bracing surface has a spherical configuration.

4. A lateral protection arrangement according to claim 3, characterized in that the fixed vehicle component includes a bevelled counter surface for cooperation with the bracing surface of the end members.

5. A lateral protection arrangement for side doors of a motor vehicle, the arrangement including at least one reinforcement means arranged within each of the side doors of the vehicle so as to extend substantially in a longitudinal direction of the vehicle, each of the reinforcement means being adapted to be braced, in case of an application of force effective in a longitudinal direction of the vehicle, one of directly and indirectly against a fixed vehicle component, characterized in that means are provided for adjusting a length of the reinforcement means so as to bridge a space between an end of the reinforced means and the fixed vehicle component, wherein the fixed vehicle component is a further reinforcement means arranged at a vehicle column provided between two side doors of the vehicle, characterized in that the reinforcement means in each of the side doors terminates in end faces facing the further reinforcement means, and in that said adjusting means are disposed in the respective end faces of the reinforcement means.

6. A lateral protection arrangement for side doors of a motor vehicle, the arrangement including at least one reinforcement means arranged within each of the side doors of the vehicle so as to extend substantially in a longitudinal direction of the vehicle, each of the reinforcement means being adapted to be braced, in case of an application of a force effective in a longitudinal direction of the vehicle, one of directly and indirectly against a fixed vehicle component, characterized in that means are provided for adjusting a length of the reinforcement means so as to bridge a space between an end of the reinforcement means and the fixed vehicle component, wherein the fixed vehicle component is a further reinforcement means arranged at a vehicle column provided between two side doors of the vehicle, the reinforcement means in each of the side doors terminates in end faces facing the further reinforcement means, and in that said adjusting means are disposed in the respective end faces of the reinforcement means, and in that said adjusting means includes end members threadably inserted into the end faces of the reinforcement means.

7. A lateral protection arrangement for side doors of a motor vehicle, the arrangement including at least one reinforcement means arranged within each of the side doors of the vehicle so as to extend substantially in a longitudinal direction of the vehicle, each of the reinforcement means being adapted to be braced, in case of an application of a force effective in a longitudinal direction of the vehicle, one of directly and indirectly against a fixed vehicle component, characterized in that means are provided for adjusting a length of the reinforcement means so as to bridge a space between an end of the reinforcement means and the fixed vehicle component, characterized in that the reinforcement means are constructed as tubular members, and in that said adjusting means includes end members adapted to be threadably inserted into ends of the tubular members, and further characterized in that the end members include a bracing surface, and in that the bracing surface has a spherical configuration.

8. A protection arrangement for a side door of a vehicle, comprising:
first fixed component means of said vehicle,
second reinforcement means to transmit compressive force longitudinally across said door for engaging said fixed component means during transmission of said force,
said second means comprising means for adjustably extending the length of said second means to bridge a space between said first and second means.

* * * * *